United States Patent
Schwaiger et al.

(10) Patent No.: US 7,105,645 B2
(45) Date of Patent: Sep. 12, 2006

(54) WATER-SOLUBLE FIBER-REACTIVE DYES, METHOD FOR THE PRODUCTION AND USE THEREOF

(75) Inventors: Günther Schwaiger, Frankfurt am Main (DE); Stefan Meier, Frankfurt am Main (DE); Werner Russ, Flösheim-Wicker (DE)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 110 days.

(21) Appl. No.: 10/512,380

(22) PCT Filed: Apr. 22, 2003

(86) PCT No.: PCT/EP03/04122

§ 371 (c)(1), (2), (4) Date: Oct. 25, 2004

(87) PCT Pub. No.: WO03/093371

PCT Pub. Date: Nov. 13, 2003

(65) Prior Publication Data

US 2005/0198748 A1    Sep. 15, 2005

(30) Foreign Application Priority Data

Apr. 27, 2002  (DE)  ................ 102 18 962

(51) Int. Cl.
- *C09B 62/515* (2006.01)
- *C09B 62/255* (2006.01)
- *C09B 62/415* (2006.01)
- *D06P 1/384* (2006.01)

(52) U.S. Cl. .............. 534/627; 534/622; 534/629; 8/549

(58) Field of Classification Search ........... 534/622, 534/627, 629; 8/549
See application file for complete search history.

(56) References Cited

U.S. PATENT DOCUMENTS

| | | | |
|---|---|---|---|
| 4,649,193 A | 3/1987 | Meininger et al. | |
| 5,015,732 A | 5/1991 | Meininger | |
| 5,319,074 A | 6/1994 | Reddig et al. | |
| 5,436,324 A | 7/1995 | Reddig et al. | |
| 5,527,886 A * | 6/1996 | Auerbach et al. | ........... 534/638 |

FOREIGN PATENT DOCUMENTS

| | | |
|---|---|---|
| DE | 2 049 664 | 4/1972 |
| DE | 40 39 866 | 6/1991 |
| DE | 43 32 255 | 3/1994 |
| EP | 0 040 806 | 12/1981 |
| EP | 0 069 376 | 1/1983 |
| EP | 0 281 898 | 9/1988 |
| EP | 0 345 577 | 12/1989 |
| EP | 0 395 951 | 11/1990 |
| EP | 0 497 174 | 8/1992 |
| EP | 0 526 792 | 2/1993 |
| GB | 1 372 368 | 10/1974 |

OTHER PUBLICATIONS

J. Soc. Dyers and Colourists (1975) pp. 33-44.
J. Soc. Dyers and Colourists (1972) pp. 93-99.
H. Rath, Lehrbuch der Textilchemie, Springer-Verlag, 3rd Edition (1972) pp. 295-299.

* cited by examiner

*Primary Examiner*—Fiona T. Powers
(74) *Attorney, Agent, or Firm*—Connolly Bove Lodge & Hutz

(57) ABSTRACT

Dyes of general formula (I) wherein $R^1$, $R^2$, M, Y and x have the meaning cited in the description, the production and use thereof for dyeing or printing material containing hydroxy and/or carbonamide groups, preferably fiber material.

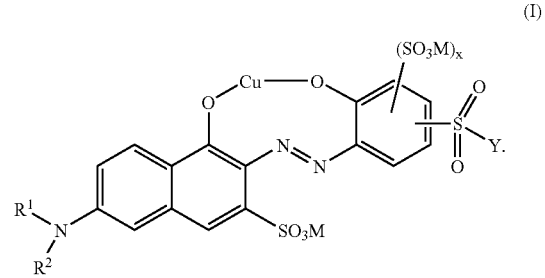

18 Claims, No Drawings

WATER-SOLUBLE FIBER-REACTIVE DYES, METHOD FOR THE PRODUCTION AND USE THEREOF

RELATED APPLICATIONS

This application is a national stage application (under 35 U.S.C. 371) of PCT/EP03/04122 filed Apr. 22, 2003 which claims benefit to German Application Serial no. 102 18 962.5 filed Apr. 27, 2002.

This invention relates to the field of fiber-reactive azo dyes.

Copper complexes of fiber-reactive monoazo compounds containing one or more fiber-reactive groups are known for example from EP-A-526792, DE-A-4332255, DE-A-2049664, EP 0040806, EP-A-069376, DE-A-4039866, EP-A-281898, EP-A- 0345577, EP-A-395951 or EP 497174. However, they have certain application defects, for example an excessive dependence of the color yield on varying parameters in the dyeing process, or an inadequate or unlevel color build-up on cotton, good color build-up resulting from the ability of a dye to provide a stronger dyeing when used in a higher dye concentration in the dyebath. Moreover, these dyes exhibit unsatisfactory fixation yields, i.e., the portion of dye permanently fixed to the material to be dyed is too low, especially at low temperatures, and also unsatisfactory wash- and lightfastnesses.

However, it is important, for ecological and economic reasons, to provide dyes having particularly high fixation yields in order that the portion of unfixed dye in the dyehouse effluent may be minimized. Moreover, dyes should always provide uniformly strong dyeings, ideally regardless of changing dyeing parameters, for example the dyeing temperature in the dyeing process. Furthermore, washfastness and lightfastness requirements are more stringent these days.

The present invention now provides dyes of the general formula (1) which surprisingly afford distinctly superior washfastnesses and lightfastnesses coupled with very good build-up. Moreover, these dyes have higher fixation yields and a distinctly lower parameter dependence in dyeing. They are therefore also more compatible with other dyes which fix at distinctly lower temperatures.

The invention accordingly provides dyes of the general formula (1):

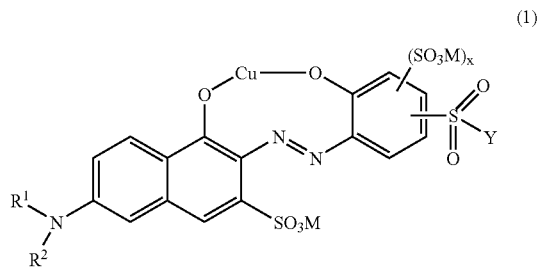

(1)

where
M is hydrogen, alkali, ammonium or the equivalent of an alkaline earth metal ion,
x is 0 or 1,
Y is —CH=CH$_2$ or —CH$_2$CH$_2$Z$^1$,
where
Z$^1$ is hydroxyl or an alkali-detachable group, and
R$^1$ is hydrogen or C$_1$–C$_4$-alkyl;

R$^2$ is a moiety of the general formulae (2), (3) or (4)

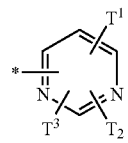

(2)

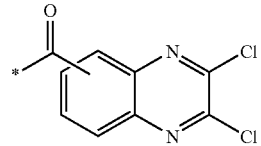

(3)

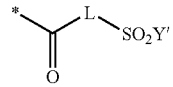

(4)

where
Y' is —CH=CH$_2$ or —CH$_2$CH$_2$Z$^1$,
where
Z$^1$ is hydroxyl or an alkali-detachable group, and
T$^1$ is hydrogen, methyl, fluorine, chlorine or bromine,
T$^2$ is hydrogen, fluorine, chlorine or bromine with the proviso that T$^2$ and T$^1$ are not both hydrogen;
T$^3$ is hydrogen, methyl, fluorine, chlorine or bromine,
L is phenylene or naphthyl, which may be substituted by up to two substituents selected from the group consisting of chloro, bromo, hydroxyl, C$_1$ to C$_4$-alkyl especially methyl, ethyl, sulfo, cyano, or else is a C$_2$ to C$_6$ alkylene which may be interrupted by 1 to 2 hetero groups, such as for example oxo, thio, amino, C$_1$–C$_4$-alkylamino.

L is preferably phenylene, ethylene, propylene and 3-oxopentylene.

(C$_1$–C$_4$)-Alkyl R$^1$ can be straight-chain or branched and is in particular selected from the group consisting of methyl, ethyl, n-propyl, i-propyl, n-butyl, i-butyl, sec-butyl and tert-butyl. Preference is given to methyl and ethyl.

Examples of preferred R$^2$ radicals of the general formula (2) are: 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl, 4,5-difluoropyrimidin-6-yl, 5-chloro-4-fluoropyrimidin-6-yl, 2,4,5-trichloropyrimidin-6-yl, 4,5-dichloropyrimidin-6-yl, 2,4-dichloropyrimidin-6-yl, 4-fluoropyrimidin-6-yl, 4-chloropyrimidin-6-yl, 2-fluoro-4-methylpyrimidin-6-yl.

Particular preference is given to R$^2$ being 2,4-difluoropyrimidin-6-yl or 5-chloro-2,4-difluoropyrimidin-6-yl.

In the foregoing general formulae and also in the subsequent general formulae, the individual symbols, whether they bear identical or different designations within any one general formula, can have meanings under their definition which are mutually identical or different.

The dyes of the general formula (1) can possess different fiber-reactive groups —SO$_2$Y and —SO$_2$Y' within the meaning of Y and Y' respectively. Examples of alkali-eliminable substituents Z$^1$ in the β-position of the ethyl group of Y or Y' are halogen atoms, such as chlorine and bromine, ester groups of organic carboxylic and sulfonic acids, such as alkylcarboxylic acids, optionally substituted benzenecarboxylic acids and optionally substituted benzenesulfonic acids, such as the groups alkanoyloxy of 2 to 5 carbon atoms, of which in particular acetyloxy, benzoyloxy, sulfobenzoyloxy, phenylsulfonyloxy and tolylsulfonyloxy, further acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms each, such as dimethylamino and diethylamino. More particularly, the fiber-reactive groups —SO$_2$Y and —SO$_2$Y' can be first vinylsulfonyl groups and secondly groups —CH$_2$CH$_2$Z$^1$, preferably β-chloroethyl and especially β-sulfatoethylsulfonyl groups.

The groups sulfo, carboxyl, phosphato and sulfato include not only their acid form but also their salt form. Accordingly, sulfo groups are groups conforming to the general formula —SO$_3$M, carboxyl groups are groups conforming to the general formula —COOM, phosphato groups are groups conforming to the general formula —OPO$_3$M$_2$ and sulfato groups are groups conforming to the general formula —OSO$_3$M in each of which M is as defined above.

The dyes of the general formula (1) according to the invention are preparable for example by conventional diazotization of the aromatic amines of the general formula (8)

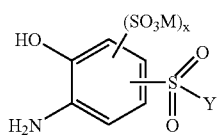

(8)

where M, Y and x are each as defined above, and coupling to a coupling component of the general formula (9)

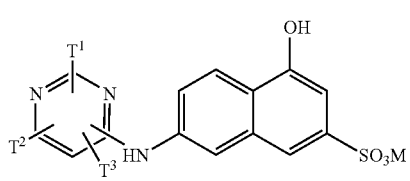

(9)

where T$^1$, T$^2$, T$^3$ and M are each as defined above, and subsequent coppering in a manner familiar to one skilled in the art to prepare the dyes of the formula (1) according to the invention.

Diazotizable amines having complexing radicals of the general formula (8) are for example 3-amino-4-hydroxyphenyl β-hydroxyethyl sulfone, 3-amino-4-hydroxyphenyl β-sulfatoethyl sulfone, 3-amino-4-hydroxyphenyl vinyl sulfone, 4-amino-5-hydroxyphenyl β-hydroxyethyl sulfone, 4-amino-5-hydroxyphenyl β-sulfatoethyl sulfone, 4-amino-5-hydroxyphenyl vinyl sulfone, 3-amino-4-hydroxy-5-sulfophenyl β-sulfatoethyl sulfone, 3-amino-4-hydroxy-5-sulfophenyl vinyl sulfone.

The coupling components of the general formula (9) are obtainable by conventional condensation of compounds of the general formula (10)

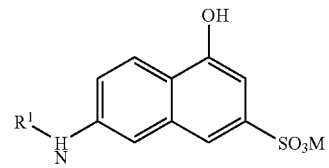

(10)

where R$^1$ and M are each as defined above, with compounds of the general formulae (11), (12) or (13)

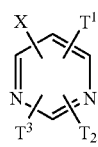

(11)

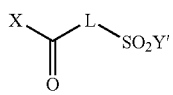

(12)

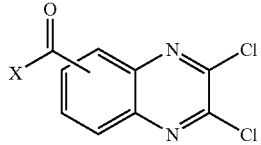

(13)

where T$^1$, T$^2$, T$^3$, L and Y' are each as defined above and X is fluorine, chlorine or bromine. When R$^2$ is a group of the general formula (2), the dye can contain two isomers, depending on the meaning of the substituents.

Compounds of the general formula (10) are for example 2-amino-5-hydroxynaphthalene-7-sulfonic acid, 2-N-methylamino-5-hydroxynaphthalene-7-sulfonic acid.

Compounds of the general formula (11) are for example 2,4,6-trifluoropyrimidine; 4,5,6-trifluoropyrimidine; 2,4,5, 6-tetrafluoropyrimidine; 4,6-difluoropyrimidine; 2,4,5,6-tetrachloropyrimidine; 2,4,6-trichloropyrimidine; 2,4,6-tribromopyrimidine; 2,4,6-trifluoro-5-chloropyrimidine; 5-methyl-2,4,6-trichloropyrimidine, 4,6-difluoro-5-chloropyrimidine.

Compounds of the general formula (12) are for example 3-chloroethylsulfonylbenzoyl chloride, 2-chloroethylsulfonylpropionyl chloride.

Compounds of the general formula (13) are 2,3-dichloroquinoxaline-5-carbonyl chloride and 2,3-dichloroquinoxaline-6-carbonyl chloride.

Alternatively, the diazotization of the compounds of the general formula (8) and coupling onto compounds of the formula (10) can be carried out first, followed by a subsequent coppering, which in turn is followed by the condensation with a compound of the general formula (11), (12) or (13), or the conventional diazotization of the aromatic amines of the general formula (8)

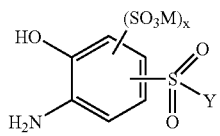

(8)

where M, Y and x are each as defined above, and coupling onto a coupling component of the general formula 10 are carried out first, followed by the condensation with a compound of the general formula (11), (12) or (13), which in turn is followed by coppering with copper sulfate pentahydrate in a manner familiar to one skilled in the art.

The separation and isolation, from the aqueous synthesis solutions, of the compounds of the general formula (1) according to the invention can be effected according to generally known methods for water-soluble compounds, for example by precipitating from the reaction medium by means of an electrolyte, such as sodium chloride or potassium chloride for example, or by evaporating the reaction solution itself, for example by spray drying. In the latter case, it is frequently advisable first to precipitate any sulfate in the solutions as calcium sulfate and remove it by filtration.

The dyes of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, or small amounts of siccatives; if they are present in a liquid, aqueous solution (including the presence of thickeners of the type customary in print pastes), they may also include substances which ensure a long life for these preparations, for example mold preventatives.

In general, the dyes of the invention are present as dye powders containing 10 to 80% by weight, based on the dye powder or the preparation, of an electrolyte salt which is also referred to as a standardizing agent. These dye powders may additionally include the aforementioned buffer substances in a total amount of up to 10% by weight, based on the dye powder. If the dyes of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight, preferably up to 2% by weight.

The dyes of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the as-synthesized solutions of the dyes of the invention, if appropriate after addition of a buffer substance and if appropriate after concentrating or diluting, can be used directly as liquid preparation for dyeing.

The present invention thus also relates to the use of the dyes of the invention for dyeing or printing these materials and to processes for dyeing or printing these materials in a conventional manner, by using dyes of the invention as a colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dyes of the invention can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good wash-fastnesses. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C., it is also possible to use superheated steam and high-pressure steam at temperatures of up to 160° C.

The acid-binding agents which effect the fixation of the dyes of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The cellulose dyeings obtained following the customary aftertreatment by rinsing to remove unfixed dye portions exhibit very good dye properties and provide by the application and fixing methods customary in the art for fiber-reactive dyes strong olive dyeings and prints having very good fastness properties, especially very good wash-, light-, alkali-, acid-, water-, seawater-, perspiration- and rubfastnesses, on the materials mentioned in the description, such as cellulose fiber materials, especially cotton and viscose. The dyeings are further notable for their high degree of fixation and good build-up on cellulose materials. Of particular advantage is the good washfastness of the dyeings, the high fixation value and the low temperature dependence compared with the prior art.

Furthermore, the dyes of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dyes of the invention are preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dyes of the invention is very good, they can also be used with advantage in customary continuous dyeing processes. The dyes of the invention dye the materials mentioned in ruby red shades.

The examples hereinbelow serve to illustrate the invention. Parts and percentages are by weight, unless otherwise stated. The compounds described in the examples in terms of a formula are partly indicated in the form of free acids; in general these compounds are prepared and isolated in the form of their salts preferably sodium or potassium salts, and used for dyeing in the form of their salts. The starting compounds mentioned in the following examples, especially table examples, can similarly be used in the synthesis in the form of the free acid or in the form of their salts, preferably alkali metal salts, such as lithium, sodium or potassium salts.

EXAMPLE 1

377 parts of 2-amino 4-sulfatoethylsulfonyl-6-phenolsulfonic acid are diazotized with sodium nitrite and coupled at pH 6–7 onto 353 parts of the condensation product of 2-amino-5-hydroxynaphthalene-7-sulfonic acid and 2,4,6-trifluoropyrimidine and subsequently reacted with 245 parts of copper sulfate pentahydrate. The red dye obtained of the formula A (one of the isomers is indicated as a free acid)

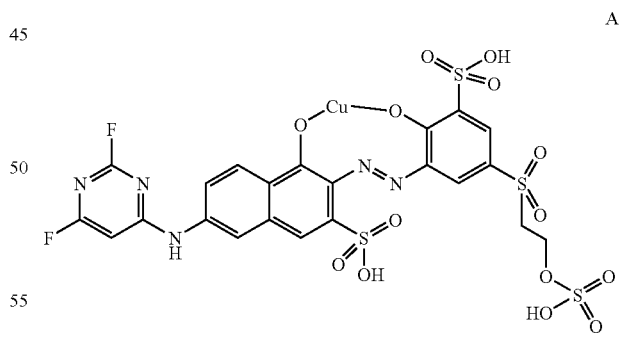

is salted out with sodium chloride, filtered off and dried at 50° C. under reduced pressure. The dye produces ruby red dyeings and prints on cotton which have very good fastnesses, especially a very good lightfastness.

EXAMPLE 2

377 parts of 2-amino 4-sulfatoethylsulfonyl-6-phenolsulfonic acid are diazotized with sodium nitrite and coupled onto 239 parts of 2-amino-5-hydroxy naphthalene-7-sulfonic acid and subsequently reacted with 250 parts of copper sulfate pentahydrate. The red dye obtained of the formula B

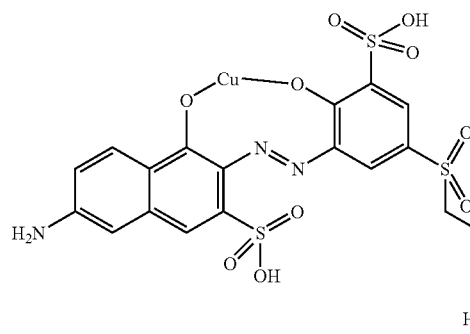

(B)

is optionally salted out with sodium chloride, filtered off and dried at 50° C. under reduced pressure. The dye produces ruby red dyeings and prints on cotton which have good fastnesses and are stable to oxidative influences.

Reaction of dye B with 2,4,6-trifluoropyrimidine gives the dye of the formula (A).

EXAMPLE 3

Proceeding as described in Examples 1 or 2 and using 2-N-methylamino-5-hydroxynaphthalene-7-sulfonic acid as a coupling component affords dye C

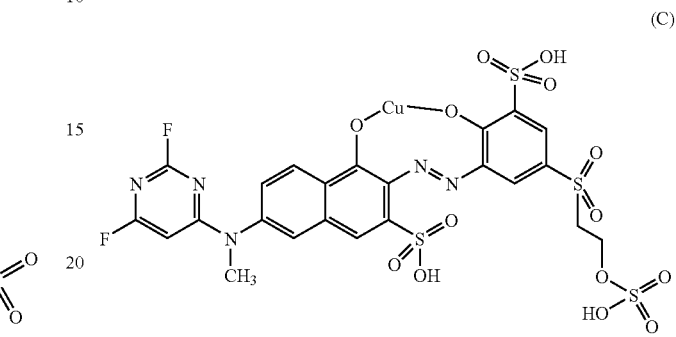

(C)

which has excellent fastnesses.

The table which follows describes further dyes according to the invention which can be prepared along the lines of the above examples, X being fluorine, chlorine or bromine.

| Example number | Compound of formula (11), (12) or (13) | Compound of formula (10) | Compound of formula (8) | Hue |
|---|---|---|---|---|
| 4 | ![structure with F, X, Cl, F pyrimidine] | ![naphthalene with OH, H2N, SO2-OH] | ![benzene with SO3H, HO, H2N, SO2-O-SO3H] | ruby red |
| 5 | ![pyrimidine with N, X, F] | ![naphthalene with OH, H2N, SO2-OH] | ![benzene with SO3H, HO, H2N, SO2-O-SO3H] | ruby red |

-continued
| Example number | Compound of formula (11), (12) or (13) | Compound of formula (10) | Compound of formula (8) | Hue |
|---|---|---|---|---|
| 6 | 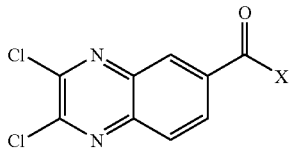 | 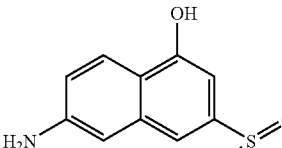 | 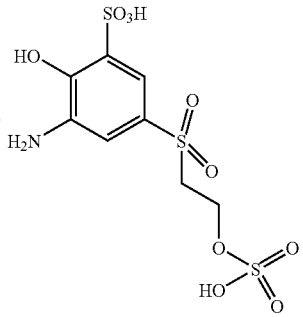 | ruby red |
| 7 | 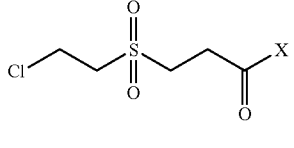 | 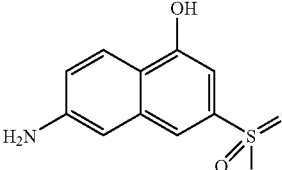 | 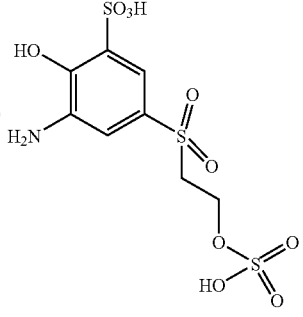 | ruby red |
| 8 | 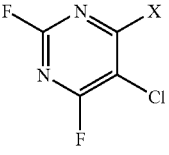 | 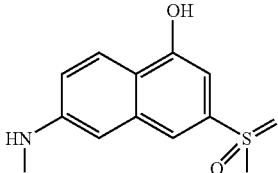 | 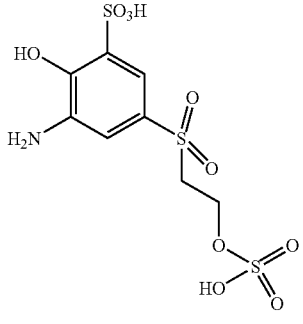 | ruby red |
| 9 |  | 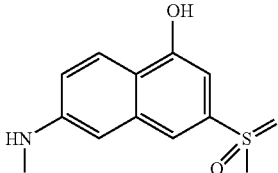 | 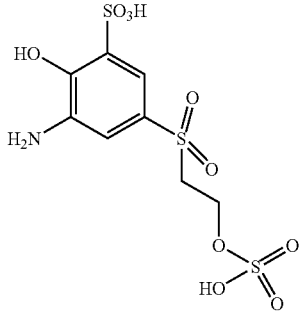 | ruby red |

-continued
| Example number | Compound of formula (11), (12) or (13) | Compound of formula (10) | Compound of formula (8) | Hue |
|---|---|---|---|---|
| 10 | | | | ruby red |
| 11 | | | | ruby red |
| 12 | | | | ruby red |
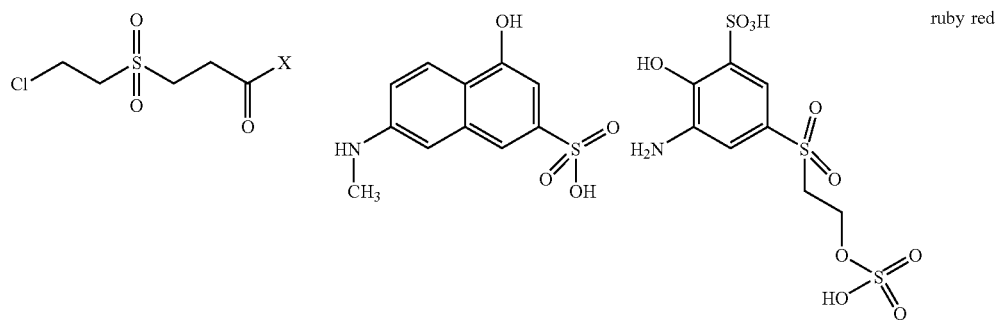
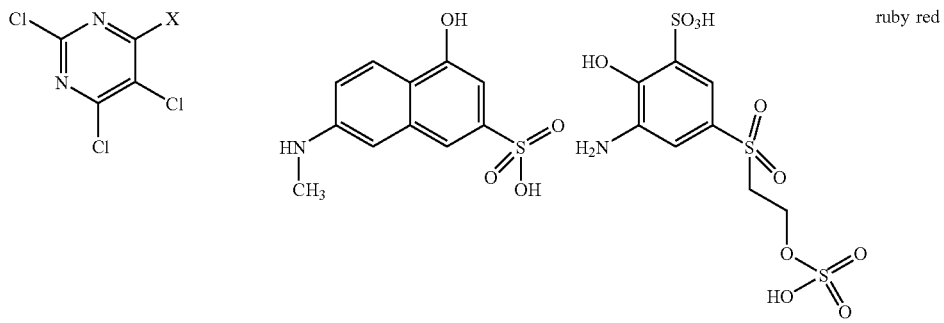
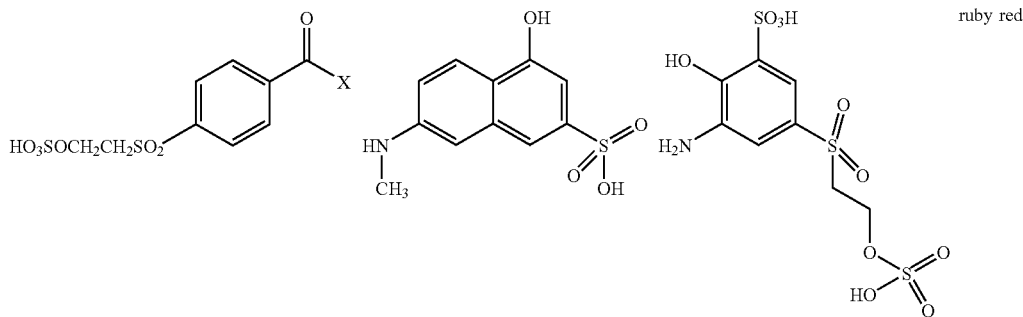

Dyeing Example:

4 parts of the dye of Example 2 are dissolved in 200 parts of water. 20 parts of sodium chloride, 5 parts of aqueous sodium hydroxide solution and 20 parts of cotton fabric are added before heating to 60° C. in a dyeing apparatus over 20 min. At 60° C., dyeing is carried out for 45 min. The cotton fabric is subsequently rinsed with water and dilute acetic acid and dried. This gives a ruby red dyeing having very good fastness properties.

What is claimed is:

1. Dyes of the general formula (1):

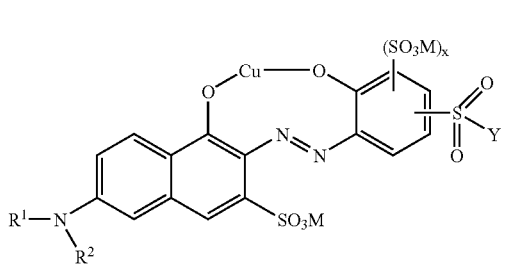
(1)

where
M is hydrogen, alkali, ammonium or the equivalent of an alkaline earth metal ion,
x is 0 or 1,
Y is —CH=CH$_2$ or —CH$_2$CH$_2$Z$^1$,
where
Z$^1$ is hydroxyl or an alkali-detachable group, and
R$^1$ is hydrogen or C$_1$–C$_4$-alkyl;
R$^2$ is a moiety of the general formulae (2), (3) or (4)

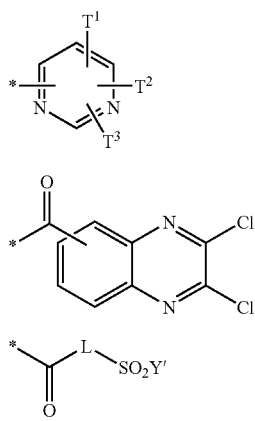

where
T$^1$ is hydrogen, methyl, fluorine, chlorine or bromine,
T$^2$ is hydrogen, fluorine or chlorine with the proviso that T$^2$ and T$^1$ are not both hydrogen;
T$^3$ is hydrogen, methyl, fluorine, chlorine or bromine,
Y' is —CH=CH$_2$ or —CH$_2$CH$_2$Z$^1$,
where
Z$^1$ is hydroxyl or an alkali-detachable group, and
L is phenylene or naphthylene, which may be substituted by up to two substituents selected from the group consisting of chloro, bromo, hydroxyl, C$_1$ to C$_4$-alkyl, sulfo, cyano, or L is a C$_2$ to C$_6$ alkylene which is optionally interrupted by 1 to 2 hetero groups.

2. Dyes as claimed in claim 1, wherein R$^2$ is a moiety of the general formula (2)

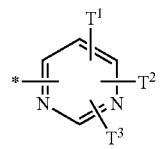
(2)

where T$^1$, T$^2$ and T$^3$ are each as defined in claim 1.

3. Dyes as claimed in claim 1, wherein x is 1 and the SO$_2$Y group is meta to the azo group.

4. Dyes as claimed in claim 1, wherein R$^2$ is difluoropyrimidyl.

5. A process for preparing compounds as claimed in claim 1 which comprises diazotizing the aromatic amines of the general formula (8)

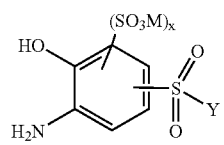
(8)

where M, Z, Y and x are each as defined in claim 1, and coupling onto a coupling component of the general formula (9)

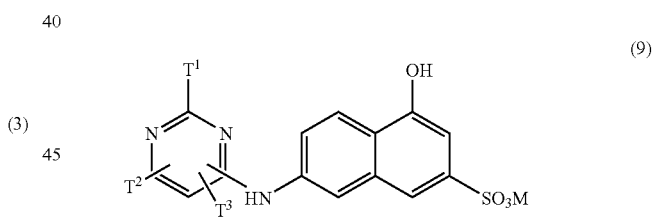
(9)

where T$^1$, T$^2$, T$^3$ and M are each as defined in claim 1, followed by a subsequent coppering with copper sulfate pentahydrate.

6. A process for preparing compounds as claimed in claim 1 which comprises diazotizing the aromatic amines of the general formula (8)

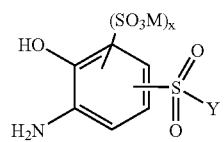
(8)

where M, Z, Y and x are each as defined in claim 1, and coupling onto a coupling component of the general formula (10)

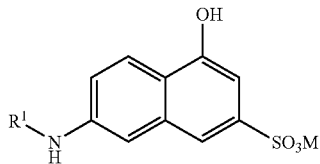
(10)

where $R^1$ and M are each as defined in claim 1, followed by subsequent coppering with copper sulfate pentahydrate and a condensation with a fiber-reactive group of the general formula (11), (12) or (13)

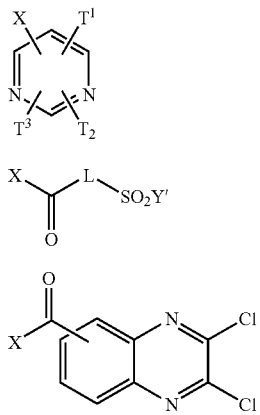
(11)

(12)

(13)

where $T^1$, $T^2$, $T^3$, L and Y' are each as defined in claim 1 and X is fluorine, chlorine or bromine.

7. A process for preparing compounds as claimed in claim 1 which comprises diazotizing the aromatic amines of the general formula (8)

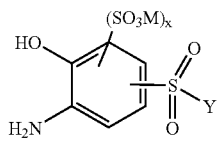
(8)

where M, Z, Y and x are each as defined in claim 1, followed by coupling onto a coupling component of the general formula (10)

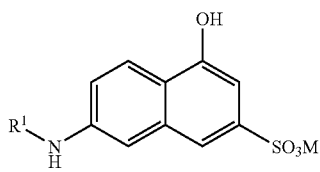
(10)

where $R^1$ and M are each as defined in claim 1, and a condensation with a fiber-reactive group of the general formula (11), (12) or (13)

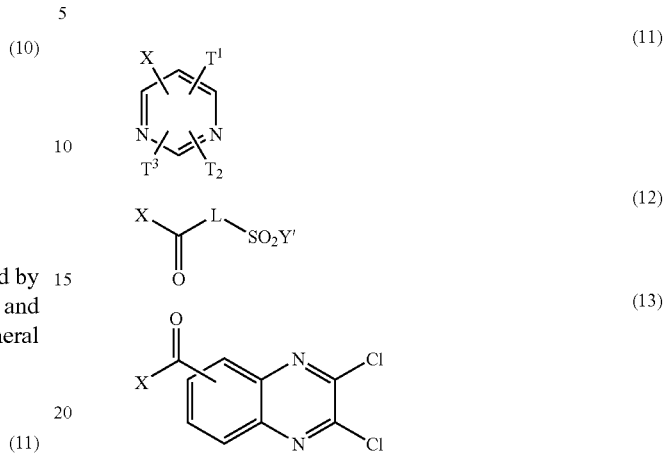
(11)

(12)

(13)

where $T^1$, $T^2$, $T^3$, L and Y' are each as defined in claim 1 and X is fluorine, chlorine or bromine and subsequent coppering with copper sulfate pentahydrate.

8. A process for dyeing or printing hydroxyl- and/or carboxamido-containing material which comprises applying one or more dyes as claimed in claim 1 in dissolved form to the material and fixing the dye or dyes on the material by means of
(a) heat or
(b) with the aid of an alkaline agent or
(c) by means of heat and with the aid of an alkaline agent.

9. A dye preparation comprising the dyes as claimed in claim 1.

10. Dyes as claimed in claim 2, wherein
L is phenylene or naphthylene, which may be substituted by up to two substituents selected from the group consisting of chloro, bromo, hydroxyl, methyl, ethyl, sulfo, cyano, or
L is a $C_2$ to $C_6$ alkylene which is optionally interrupted by 1 to 2 hetero groups selected from the group consisting of oxo, thio, amino and $C_1$–$C_4$-alkylamino.

11. Dyes as claimed in claim 10, wherein x is 1 and the $SO_2Y$ group is meta to the azo group.

12. Dyes as claimed in claim 11, wherein $R^2$ is difluoropyrimidyl.

13. The process as claimed in claim 8, wherein the material is a fiber material.

14. Dyes as claimed in claim 2, wherein L is phenylene, ethylene, propylene or oxopentylene.

15. Dyes as claimed in claim 1, wherein $R^2$ is 5-chloro-2,4-difluorpyrimidin-6-yl.

16. The process as claimed in claim 5, wherein the aromatic amines of formula (8) are 3-amino-4-hydroxyphenyl β-hydroxyethyl sulfone, 3-amino-4-hydroxyphenyl β-sulfatoethyl sulfone, 3-amino-4-hydroxyphenyl vinyl sulfone, 4-amino-5-hydroxyphenyl β-hydroxyethyl sulfone, 4-amino-5-hydroxyphenyl β-sulfatoethyl sulfone, 4-amino-5-hydroxyphenyl vinyl sulfone, 3-amino-4-hydroxy-5-sulfophenyl β-sulfatoethyl sulfone, or 3-amino-4-hydroxy-5-sulfophenyl vinyl sulfone.

17. The process as claimed in claim 6, wherein said aromatic amines of formula (8) are 3-amino-4-hydroxyphenyl β-hydroxyethyl sulfone, 3-amino-4-hydroxyphenyl β-sulfatoethyl sulfone, 3-amino-4-hydroxyphenyl vinyl sulfone, 4-amino-5-hydroxyphenyl β-hydroxyethyl sulfone, 4-amino-5-hydroxyphenyl β-sulfatoethyl sulfone, 4-amino-5-hydroxyphenyl vinyl sulfone, 3-amino-4-hydroxy-5-sulfophenyl β-sulfatoethyl sulfone, or 3-amino-4-hydroxy-5-sulfophenyl vinyl sulfone;

said coupling component of the general formula (10) are 2-amino-5-hydroxynaphthalene-7-sulfonic acid or 2-N-methylamino-5-hydroxynaphthalene-7-sulfonic acid;

fiber-reactive group of the general formula (11) are 2,4,6-trifluoropyrimidine; 4,5,6-trifluoropyrimidine; 2,4,5,6-tetrafluoropyrimidine; 4,6-difluoropyrimidine; 2,4,5,6-tetrachloropyrimidine; 2,4,6-trichloropyrimidine; 2,4,6-tribromopyrimidine; 2,4,6-trifluoro-5-chloropyrimidine; 5-methyl-2,4,6-trichloropyrimidine or 4,6-difluoro-5-chloro-pyrimidine;

fiber-reactive group of the general formula (12) are 3-chloroethylsulfonyl-benzoyl chloride or 2-chloroethylsulfonylpropionyl chloride; and fiber-reactive group of the general formula (13) are 2,3-dichloroquinoxaline-5-carbonyl chloride or 2,3-dichloroquinoxaline-6-carbonyl chloride.

18. The process as claimed in claim 7, wherein said aromatic amines of formula (8) are 3-amino-4-hydroxyphenyl β-hydroxyethyl sulfone, 3-amino-4-hydroxyphenyl β-sulfatoethyl sulfone, 3-amino-4-hydroxyphenyl vinyl sulfone, 4-amino-5-hydroxyphenyl β-hydroxyethyl sulfone, 4-amino-5-hydroxyphenyl β-sulfatoethyl sulfone, 4-amino-5-hydroxyphenyl vinyl sulfone, 3-amino-4-hydroxy-5-sulfophenyl β-sulfatoethyl sulfone, or 3-amino-4-hydroxy-5-sulfophenyl vinyl sulfone;

said coupling component of the general formula (10) are 2-amino-5-hydroxynaphthalene-7-sulfonic acid or 2-N-methylamino-5-hydroxynaphthalene-7-sulfonic acid;

fiber-reactive group of the general formula (11) are 2,4,6-trifluoropyrimidine; 4,5,6-trifluoropyrimidine; 2,4,5,6-tetrafluoropyrimidine; 4,6-difluoropyrimidine; 2,4,5,6-tetrachloropyrimidine; 2,4,6-trichloropyrimidine; 2,4,6-tribromopyrimidine; 2,4,6-trifluoro-5-chloropyrimidine; 5-methyl-2,4,6-trichloropyrimidine or 4,6-difluoro-5-chloro-pyrimidine;

fiber-reactive group of the general formula (12) are 3-chloroethylsulfonyl-benzoyl chloride or 2-chloroethylsulfonylpropionyl chloride; and fiber-reactive group of the general formula (13) are 2,3-dichloroquinoxaline-5-carbonyl chloride or 2,3-dichloroquinoxaline-6-carbonyl chloride.

* * * * *

UNITED STATES PATENT AND TRADEMARK OFFICE
CERTIFICATE OF CORRECTION

| | |
|---|---|
| PATENT NO. | : 7,105,645 B2 |
| APPLICATION NO. | : 10/512380 |
| DATED | : September 12, 2006 |
| INVENTOR(S) | : Günther Schwaiger et al. |

It is certified that error appears in the above-identified patent and that said Letters Patent is hereby corrected as shown below:

Item (75), Inventors, "Werner Russ, Flösheim-Wicker (DE)" should read

-- Werner Russ, Flörsheim-Wicker (DE)--

Signed and Sealed this

Twenty-third Day of January, 2007

JON W. DUDAS
*Director of the United States Patent and Trademark Office*